United States Patent [19]

Hruby

[11] 3,904,768

[45] Sept. 9, 1975

[54] METHOD OF INCREASING PROTEIN CONTENT OF A WASTE FOOD PRODUCT

[76] Inventor: Frank J. Hruby, 2809 Tallmadge Rd., Ravenna, Ohio 44266

[22] Filed: May 8, 1974

[21] Appl. No.: 468,016

Related U.S. Application Data

[63] Continuation-in-part of Ser. No. 397,072, Sept. 13, 1973, Pat. No. 3,870,798, which is a continuation-in-part of Ser. No. 70,763, March 9, 1970, Pat. No. 3,787,583, which is a continuation of Ser. No. 550,798, May 17, 1966, abandoned.

[52] U.S. Cl................................. 426/53; 426/464
[51] Int. Cl.² ......................................... A23K 1/10
[58] Field of Search..................... 426/53, 59, 464

[56] References Cited
UNITED STATES PATENTS 1,440,727   1/1923   Faust .................................... 426/60
3,314,797   4/1967   Hess et al. ............................ 426/53

*Primary Examiner*—Raymond N. Jones
*Attorney, Agent, or Firm*—Watts, Hoffmann, Fisher & Heinke Co.

[57] ABSTRACT

A method of increasing the protein content of a waste food product especially, bagasse and citrus pulp, suitable for livestock feed by comminuting the waste food product, adding urea or other suitable ammonium compound, pressure cooking with steam to sterilize and liquefy the batch, cooling and fermenting, passing air through the batch during fermentation, drying, and comminuting.

5 Claims, No Drawings

METHOD OF INCREASING PROTEIN CONTENT OF A WASTE FOOD PRODUCT

CROSS-REFERENCE TO RELATED APPLICATIONS

This is a continuation-in-part of copending application Ser. No. 397,072 filed Sept. 13, 1973, now U.S. Pat. No. 3,870,798 which in turn is a continuation-in-part of application Ser. No. 70763 filed Mar. 9, 1970, now U.S. Pat. No. 3,787,583 which in turn was a continuation of application Ser. No. 550,798, filed May 17, 1966, now abandoned.

The present invention relates to a process or method for increasing the protein content of waste food products to produce feed for livestock, poultry or other animals. More particularly, the present invention relates to a process for manufacturing such feed from bagasse, citrus pulp, beet pulp and the like.

Certain prior art processes have been practiced in producing livestock feed and fertilizers from various types of waste raw materials, including slaughter-house wastes, cheese manufacturing or dairy processing waste, brewing wort or wastes, fish or seafood scraps, sewage, and other similar materials. Such methods or processes have often required multiple sterilization, high pressure digestion, and other expensive and time-consuming processing operations or steps, to produce commercially acceptable livestock feed. Moreover, the feed product thus obtained may not attain presently desired quality standards in terms of protein content, vitamin, starch and carbohydrate balances. Therefore, it has often been necessary or desirable to augment these processed waste materials with additives or other supplemental feed materials.

Certain other prior art process concepts have contemplated employing garbage and kitchen waste as a raw material for the production of animal foods. However, these concepts have not encompassed processing steps or operations insuring adequate control over the stability of contents of the resultant feed product. Therefore, these processes have not been commercially exploited to any extent, owing to the necessity for employing expensive feed material additives or fillers.

Prior art processes already known include those shown in the following U.S. Pat. Nos.

| Coates | 2,431,371; |
| Hess et al | 3,314,797; |
| Matsuoka | 3,597,218; |
| Beddies | 663,802; |
| Fuentes | 2,888,348; |
| Wells | 1,307,992; |
| Young | 1,210,250; |
| Faust | 1,440,727; |

The aforementioned cross-referenced related applications disclose processes for producing livestock feed of improved quality including higher protein content, from garbage. It has now been discovered that the protein content of waste food product, particularly bagasse (sugar cane waste) citrus pulp, and beet pulp, can be even further improved by the addition of urea or other suitable ammonium compound to the material, when processed generally as disclosed in said cross-referenced applications.

By way of summary, the invention is a process for manufacturing livestock feed from a waste food product. The product is first refined to a degree through comminuting and the removal of foreign, non-food particles. Urea is added to and mixed with the product, which is then batch processed by feeding a batch of the product into a pressure tank, cooking the batch in the pressure tank at a pressure above atmospheric and at temperatures above 212° Fahrenheit for a sufficient time to sterilize and liquefy the batch, thereafter cooling the batch to a temperature below 150° Fahrenheit, adding a fermenting agent to the cooled batch, and fermenting the entire liquefied batch. In the preferred process oxygen in the form of air is passed through the liquefied batch during fermentation until emission of carbon dioxide substantially stops. The fermented batch is then dried and thereafter comminuted. The addition of urea or other suitable ammonium compound and the passing of air through the liquefied batch during fermentation results in an improved, i.e., higher, protein value of the resulting batch. At the same time, the air tends to evaporate the alcohol from the liquefied batch, produced by the fermentation. While this will typically result in the loss of the alcohol, the loss may be offset by a higher economic value on the increased protein content of the batch. Moreover, where recovery of alcohol is desired, the fermentation tank can be constructed to trap the escaping vapors.

From the foregoing it will be apparent that it is an object of the present invention to provide an improved method or process for producing inexpensive and high quality livestock feed from waste foodstuffs.

It is a further object of the invention to provide an improved process for substantially increasing the protein content of waste food products suitable for livestock feed.

The above and other objects, features and advantages of the present invention will become more apparent and better understood upon reference to the following detailed description.

While the process, including the specific operations or steps, as described herein in detail, are preferred embodiments or modes of practice of the present invention, it will be appreciated by those skilled in the art that the principles of the invention may be applied with equal facility with certain variations or changes in operations performed, materials, catalysts, or reactants added and their proportions. Such variations, changes or substitutions of equivalent operations or materials are comprehended within the scope and spirit of the invention set forth in the appended claims.

Referring to the preferred process of the invention in detail, a waste food product, preferably bagasse or citrus pulp, or beet pulp, is if necessary first screened to remove foreign particles and is then comminuted, as by grinding or milling or crushing, for example, in a rotary mill or press, to mechanically condition or refine the waste food product. Urea is added to and mixed with the product. Most conveniently, the urea is added before or during the comminuting to achieve a thorough mixing. Approximately 3 percent by weight (based on the dry weight of the bagasse, citrus or beet pulp) of urea is added. The refined waste food product with the urea added is transported, preferably by automatic conveyor, and charged into a pressure vessel.

With certain waste food products, it may be necessary to add a neutralizer or buffer, such as slaked lime, to neutralize the product. With the use of bagasse or citrus pulp, no neutralizing agent is added.

The waste food product will vary in its moisture content, and it may be necessary to add water to the charge of the product in the pressure vessel in order to produce a batch that is liquid or fluid in consistency.

The fluid waste food product charge is enclosed within the pressure vessel and then heated and pressure cooked with steam introduced into or generated within the vessel at approximately 15 to 25 p.s.i.g. steam pressure, preferably 20 p.s.i.g., and at corresponding steam temperature ranges, i.e., approximately 250° to 270°F. and preferably 260° F. The pressure cooking proceeds for about two hours until substantially all bacteria in the substance are killed and the charge has been substantially sterilized and liquefied.

Following the pressure sterilization operation in the closed pressure vessel, the charge is preferably transferred to a closed cooling and fermentation vessel, where the charge of sterilized, and liquefied waste food product is cooled to a temperature range of 50° F. to 150° F., the preferable terminal temperature for cooling being about 130° F. At this point, a suitable amount of yeast (typically about 3 percent by weight based on the dry weight of the bagasse, citrus or beet pulp) or other suitable fermentation agent is added to the charge in the cooling and fermentation vessel, preferably through a saccharometer controlled or regulated valve. In a typical full scale operation, once an initial batch of material has been processed, the yeast can be "added" to the subsequent batch by leaving a portion of the previous batch in the fermentation vessel.

Fermentation in the vessel is permitted to proceed and continue until substantially all of the carbon dioxide is emitted from the fermenting batch and drawn off. During fermentation, oxygen is preferably introduced into the fermenting batch, typically in the form of air under pressure bubbled through the batch from a pipe or pipes or other outlets within the lower part of the fermentation vessel. For best results the bubbling of air through the batch is continued throughout the fermentation, until carbon dioxide substantially stops being emitted. This flow of air tends to evaporate and carry from the batch the alcohol produced by the fermentation process.

When the fermentation has substantially concluded, the batch is discharged by suitable conveying means into a continuous drier mechanism. The batch being discharged from the fermentation vessel is preferably sampled to determine the level of contents of starch and carbohydrates. The batch discharged should have more than adequate portions and contents of protein, vitamins and minerals for livestock feed.

From the continuous drying mechanism the dried batch is fed or conveyed to a hammermill or other suitable comminuter or other pulverized equipment. This produces a pulpy product which is then bagged or packaged manually or with suitable equipment.

Apparatus of a type generally suitable for processing waste food product, except for the introduction of air into the fermentation vessel, is disclosed in the aforementioned cross-reference patent.

While urea, $CO(NH_2)_2$, is the preferred material added to the waste food product in accordance with the practice of the process and results in a very substantial increase in protein content in the processed product, other amides and ammonium compounds are also believed suitable for increasing the protein content with the present process. For example, other amides such as acetamide and certain ammonium salts such as ammonium carbonate, ammonium nitrate, ammonium sulphate and ammonium phosphate (monobasic, dibasic or hemibasic), and amines, and compounds such as guanidine should be suitable.

By way of example and not limitation, the following small scale experiments performed in accordance with the present invention will further illustrate the process.

EXAMPLE I

Eight oz. of dry citrus pulp (approximately 8 to 12 percent moisture), with a pH of approximately 6.0, and preground, was placed in a pressure cooker. One-fourth oz. by weight urea powder was diluted with water and added to and thoroughly mixed with the citrus pulp. Sufficient water was added to the container and mixture to produce a fluid consistency. The container was closed and heated to establish a steam pressure within the container or cooker of 20 p.s.i. gauge and a corresponding temperature of 259° F. The mixture was heated at this temperature and pressure for approximately 2 hours and then allowed to cool to 130° F.

One-fourth oz. dry yeast was added to the cooled mixture, along with approximately one teaspoon sugar (alternatively, a carbohydrate could have been used) to built up the desired strain of bacteria. Typically, in a full scale operation, this addition of sugar or carbohydrate is unnecessary and in fact part of a previously fermented batch can be mixed with the new batch rather than adding yeast. Fermentation was allowed to proceed and during fermentation air under pressure was bubbled through the mixture. Fermentation was continued until the emission of carbon dioxide stopped. The material was then dried and comminuted.

An analysis of unprocessed citrus pulp and of citrus pulp after processing was made by an independent testing laboratory and the results were as follows:

| Description | Unprocessed (% by weight) As is Basis | Unprocessed (% by weight) Dry Basis | Processed (% by weight) As is Basis | Processed (% by weight) Dry Basis |
|---|---|---|---|---|
| pH | 5.0 | | | |
| Moisture | 9.86 | .00 | 12.67 | .00 |
| Fat (%) | 2.74 | 3.04 | 2.44 | 2.79 |
| Crude Protein (%) | 6.1 | 6.7 | 34.6 | 39.6 |
| Digestible Protein (%) | 2.6 | 2.9 | 15.2 | 17.4 |
| Fiber (%) | 12.45 | 13.81 | 11.80 | 13.51 |
| Ash (%) | 5.98 | 6.63 | 6.95 | 7.95 |
| NFE (Crude Carbohydrates(%) | 62.86 | 69.73 | 31.53 | 36.11 |
| Digestible Carbohydrates (%) | .00 | .00 | .00 | .00 |
| Total Digestible Nutrients (%) | .00 | .00 | 15.22 | 17.43 |

Example I was repeated except that bagasse was substituted for citrus pulp.

An analysis of the unprocessed bagasse and of the bagasse after processing was made by an independent testing laboratory and the results were as follows:

| Description | Unprocessed (% by weight) As is Basis | Unprocessed (% by weight) Dry Basis | Processed (% by weight) As is Basis | Processed (% by weight) Dry Basis |
|---|---|---|---|---|
| pH | 4.7 | | 5.3 | |
| Moisture | 6.28 | .00 | 8.17 | .00 |
| Fat (%) | .69 | .73 | .40 | .43 |

-Continued

| Description | Unprocessed (% by weight) | | Processed (% by weight) | |
| --- | --- | --- | --- | --- |
| | As is Basis | Dry Basis | As is Basis | Dry Basis |
| Crude Protein (%) | 1.6 | 1.7 | 33.6 | 36.5 |
| Digestible Protein (%) | .8 | .9 | 18.1 | 19.7 |
| Fiber (%) | 43.63 | 46.56 | 30.58 | 33.30 |
| Ash (%) | .64 | .68 | 12.11 | 13.18 |
| NFE (Crude Carbohydrates (%) | 47.15 | 50.31 | 15.13 | 16.48 |
| Digestible Carbohydrates (%) | 23.57 | 25.15 | 7.56 | 8.24 |
| TDN (%) | 43.23 | 46.12 | 38.77 | 42.22 |

A comparison of the above results shows that the crude and digestible protein content is increased in citrus pulp by a factor of approximately six times and in bagasse by a factor of approximately 20 times.

EXAMPLE III

Example II was repeated except sulphamide (ammono sulphuric acid) $SO_2(NH)_2$ was substituted for urea in approximately the same quantity. The resulting crude protein obtained was 23.19 percent by weight.

It should be apparent from the foregoing description that the above described processes accomplish the several objects of the invention.

What is claimed is:

1. A process of increasing the protein content of a waste food product suitable for livestock feed, selected from the group consisting of bagasse, citrus pulp and beet pulp, consisting essentially of the steps of:
   a. first comminuting said food product;
   b. adding urea, ammonium sulfate, sulphamide or ammonium nitrate to the waste food product in an amount effective to significantly increase the protein content thereof after processing and mixing it therewith;
   c. cooking a batch of the feed product in a pressure vessel at pressure above atmospheric and at temperatures above 212° Fahrenheit for a sufficient time to sterilize and liquefy said batch,
   d. thereafter cooling the batch to a temperature below 150° Fahrenheit,
   e. adding a fermenting agent to the cooled batch,
   f. then fermenting the entire liquefied batch until emission of carbon dioxide substantially stops, and
   g. subsequently drying said fermented batch.

2. A process of increasing the protein content of a waste food product suitable for livestock feed, selected from the group consisting of bagasse, citrus pulp and beet pulp, consisting essentially of the steps of:
   a. first comminuting said food product;
   b. adding urea, ammonium sulfate, sulphamide or ammonium nitrate to the waste food product in an amount effective to significantly increase the protein content thereof after processing and mixing it therewith;
   c. cooking a batch of the food product in a pressure vessel at pressure above atmospheric and at temperatures above 212° Fahrenheit for a sufficient time to sterilize and liquefy said batch,
   d. thereafter cooling the batch to a temperature below 150° Fahrenheit,
   e. adding a fermenting agent to the cooled batch,
   f. then fermenting the entire liquefied batch until emission of carbon dioxide substantially stops,
   g. introducing oxygen under pressure into the liquefied batch during the fermenting step, and
   h. subsequently drying said fermented batch.

3. A process of producing livestock feed from a waste food product selected from the group consisting of bagasse, citrus pulp and beet pulp, consisting essentially of the steps of:
   a. first refining said product by comminuting,
   b. then batch processing the product by
      i. feeding a batch of uncooked product into a pressure tank,
      ii. adding urea, ammonium sulfate, sulphamide, or ammonium nitrate to the batch in an amount effective to significantly increase the protein content of the product after processing,
      iii. cooking the batch in the pressure tank at pressure above atmospheric and at temperatures above 212° Fahrenheit for a sufficient time to sterilize and liquefy said batch,
      iv. thereafter cooling the batch to a temperature below 150° Fahrenheit;
      v. adding a fermenting agent to the cooled batch, and,
      vi. then fermenting the entire liquefied batch while introducing air into the batch until emission of carbon dioxide substantially stops;
   c. subsequently drying said fermented batch while removing any alcoholic vapors that may be present; and
   d. thereafter comminuting said dried batch.

4. A process as set forth in claim 3 wherein the urea, ammonium sulfate, sulphamide or ammonium nitrate added to the batch is equal in weight to approximately 3 percent of the dry weight of the waste food product.

5. A process of producing livestock feed from a waste food product selected from the group consisting of bagasse, citrus pulp and beet pulp consisting essentially in the steps of:
   a. refining said waste food product by comminuting;
   b. adding urea to the waste food product in an amount that results in a significant increase in the protein content after processing;
   c. processing the waste food product by
      i. feeding a batch of refined waste food product into a pressure tank,
      ii. adding water to the batch when the batch is not fluid,
      iii. thereafter sterilizing and liquefying the batch by cooking the batch in a closed vessel under steam at a pressure of between 15 to 25 pounds per square inch gauge at temperatures between 250 and 270° Fahrenheit for approximately two hours,
      iv. then cooling the batch to a temperature between 50° and 150° Fahrenheit,
      v. adding a fermenting agent to the cooled batch, and
      vi. then fermenting the entire liquefied batch while introducing air under pressure into the batch until emission of carbon dioxide substantially stops;
   d. subsequently drying said fermented batch while removing any alcoholic vapors that may be present; and
   e. thereafter comminuting said dried batch.

* * * * *